3,320,195
COATING COMPOSITIONS CONTAINING A
TETRASUBSTITUTED GUANIDINE
Robert A. Braun, Newark, Del., assignor to E. I. du Pont de Nemours and Company, Wilmington, Del., a corporation of Delaware
No Drawing. Filed Sept. 15, 1966, Ser. No. 579,529
10 Claims. (Cl. 260—23.5)

This application is a continuation-in-part of application Ser. No. 224,559, filed Sept. 18, 1962, now abandoned.

This invention relates to air-drying coating compositions. It is more particularly directed to coating compositions containing, (a) as a film-forming component, at least one compound having a plurality of 1,3-cyclic acetal radicals which bear vinyl or substituted vinyl radicals in their 2-positions,
(b) a siccative metal drier, and
(c) a substituted guanidine represented by the formula

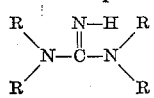

wherein R is an alkyl radical of 1 through 8 carbon atoms, an alkenyl radical of 3 through 10 carbon atoms, or a cycloalkyl radical of 6 through 10 carbon atoms.

It has been found, according to this invention, that inclusion of these guanidine compounds in coating compositions containing cyclic acetal compounds as film-formers can accelerate the air-drying time of the compositions by as much as 70%.

Illustrative of the guanidines which can be used according to the invention are 1,1,3,3-tetramethyl guanidine
1,1,3,3-tetra-n-octyl guanidine
1,3-dimethyl-1,3-diethyl guanidine
1,3-dimethyl-1,3-di-n-octyl guanidine
1,1-dimethyl-3,3-isoamyl guanidine
1-methyl-1-n-heptyl-3,3-di-sec-butyl guanidine
1,3-dimethyl-1-n-propyl-3-n-hexyl guanidine
1,1,3,3-tetra-n-propyl guanidine
1,1-dimethyl-3,3-t-octyl guanidine
1,1-diallyl-3,3-dicyclohexyl guanidine
1,3-di-α-octyl vinyl-1,3-di-cyclooctyl guanidine
1-methyl-1-cyclodecyl-3,3-diisopropenyl guanidine Of these guanidine accelerators, 1,1,3,3-tetramethyl guanidine is preferred because of the high drying acceleration obtained when it is used, and for its low cost.

The guanidine accelerators are present in the compositions of the invention at concentrations of from 0.05%–1%, by weight of the film-forming material. The compositions containing 0.2–0.6% of the guanidine compound air-dry best.

The guanidines can be prepared according to methods disclosed in German Patent 1,795,738 or Canadian Patent 626,643.

FILM-FORMING INGREDIENTS

The principal film-forming ingredients in the compositions of the invention are compounds which contain a plurality of 1,3-cyclic acetal radicals. These cyclic acetal radicals must bear vinyl or substituted vinyl radicals in their 2-positions. Such cyclic acetals, and methods for preparing them, are disclosed in U.S. Patent 3,010,918 and U.S. Patent 3,010,923.

Cyclic acetal compounds preferred for use in the compositions of the invention are polycarboxylic acid esters containing a plurality of 2-vinyl-1,3-dioxanyl radicals. Illustrative of these are Bis-[(2-vinyl-1,3-dioxolan-4-yl)butyl]orthophthalate
Bis-[(2-vinyl-1,3-dioxolan-4-yl)butyl]itaconate
Bis-[(2-vinyl-1,3-dioxolan-4-yl)butyl]maleate
Bis-[(2-vinyl-1,3-dioxolan-4-yl)butyl]fumarate
Bis-[(2-vinyl-1,3-dioxolan-4-yl)butyl]terephthalate
Bis-[(2-vinyl-1,3-dioxolan-4-yl)butyl]mesaconate
Tetrakis-[(2-vinyl-1,3-dioxolan-4-yl)butyl]pyromellitate
Tris-[(2-vinyl-1,3-dioxolan-4-yl)butyl]propane tricarboxylate
Bis-[(2-vinyl-1,3-dioxolan-4-yl)butyl]hexahydrophthalate
Bis-[(2-vinyl-1,3-dioxolan-4-yl)propyl]citraconate
Tris-[(2-vinyl-1,3-dioxolan-4-yl)propyl]trimellitate
Bis-[(2-vinyl-1,3-dioxolan-4-yl)propyl]isophthalate
Bis-[(2-vinyl-1,3-dioxolan-4-yl)methyl]maleate
Bis-[(2-vinyl-1,3-dioxolan-4-yl)methyl]glutarate
Bis-[(2-vinyl-1,3-dioxolan-4-yl)methyl]adipate Compounds in the foregoing list which are especially preferred for the degree of drying acceleration they give are the dicarboxylic acid diesters containing two 2-vinyl-1,3-dioxanyl radicals. Most preferred are bis-[(2-vinyl-1,3-dioxolan-4-yl)butyl]orthophthalate and bis-[(2-vinyl-1,3-dioxolan-4-yl)butyl]itaconate.

Linear polymers having such cyclic acetal groups pendant from the backbone polymer chain can also be used as film formers. These polymers can be prepared by transesterifying (a) a preformed vinyl addition polymer having pendant carbalkoxy groups, preferably carbalkoxy groups containing 2 to 5 carbon atoms, attached to different carbon atoms having at least one hydrogen substituent, with
(b) a hydroxyalkyl substituted 1,3-cyclic acetal bearing a vinyl or substituted vinyl radical in its 2-position.

The cyclic acetal film-formers are ordinarily present in compositions of the invention at concentrations of from 40% through 95%, by weight of the total composition.

METAL DRIERS

The metal driers used in the compositions of the invention can be any of the well-known siccative metal containing compounds or complexes which are ordinarily added to drying and semi-drying oil containing paints, varnishes and enamels to improve their air drying properties. Illustrative of suitable metals are cobalt, lead, manganese, zinc, iron, nickel, chromium, cerium, calcium, aluminum zirconium and magnesium. These metals are generally speaking, used as soluble soaps or salts, such as acetates, hydrates, oxyhydrates, octoates, oleates, linoleates, naphthenates, resinates and the alkyl half esters of dicarboxylic acids. Mixtures of these compounds can also be used. Cobalt salts are preferred because compositions containing them show superior air-drying properties.

The amount of metal drier used will vary according to the nature of the metal and the film-forming component being used, the air-drying speed desired, the conditions under which the coating compositions are to be used, the substrates to be coated, and like factors. Concentrations of 0.0005%–3% (based on metal), by weight of the film-forming material, will ordinarily be satisfactory. If the composition is to be dried at room temperature, the amount will preferably be 0.01%–1%. If the composition is to be forced dried or baked, the composition will preferably contain 0.0005%–0.01% of the siccative metal.

PEROXIDES

The air-drying characteristics of the compositions of the invention can be improved still more and their resistance to viscosity increases on storage can be enhanced by adding 0.1%–3%, by weight of the film-forming material, of a tertiary alkyl hydroperoxide whose alkyl group contains 4 through 8 carbon atoms, a dialkyl phenyl methyl hydroperoxide whose alkyl group contains 1 through 3 carbon atoms, or an alkyl aldehyde peroxide whose alkyl group contains 6 through 12 carbon atoms. Illustrative of such compounds are t-Butyl hydroperoxide
2-hydroperoxy-2-methyl-pentane
2-hydroperoxy-2-methyl-butane
3-hydroperoxy-3-methyl-heptane
Cumene hydroperoxide
α,α-Diethyl benzyl hydroperoxide
α-n-Propyl-α-methyl benzyl hydroperoxide
p-Menthane hydroperoxide
Hydroxy-n-heptyl peroxide
Hydroxy-n-octyl peroxide
Hydroxy-n-dodecyl peroxide Tertiary butyl hydroperoxide and hydroxy-n-heptyl peroxide are preferred because of the superior air-drying properties of compositions containing them.

OTHER INGREDIENTS

The compositions of the invention can contain such other film-forming ingredients as linseed-, soya-, China-wood-, perilla-, dehydrated castor-, safflower- and oiticica oil, oleoresinous varnishes, modified alkyd resins and the mono- and polycarboxylic acid esters of dihydropyranyl methanol, as well as epoxy resins such as the condensation products of an epihalohydrin and a diphenol, and amine-aldheyde resins such as alkylated urea/formaldehyde, and the like.

The compositions can also contain, as film-forming ingredients, cyclic acetal compounds which contain only a single 1,3-cyclic acetal radical bearing a vinyl or substituted vinyl radical in the 2-position. Illustrative of these are (2-vinyl-1,3-dioxolan-4-yl-butyl)pelargonate, (2-vinyl-1,3-dioxolan-4-yl-methyl)benzoate and the corresponding oleates and stearates of these.

It may be desirable, in certain instances, to add solvents or diluents to the compositions to bring their viscosities to usable levels. Such organic liquids as aliphatic- and aromatic hydrocarbons, esters, ketones, alcohols, and mixtures of these are satisfactory.

Customary adjuncts and modifiers such as surfactants, diluents, plasticizers, catalysts, hardeners, and pigments and extenders such as metal oxides, hydroxides, chromates, silicates, sulfides, sulfates, carbonates, organic dyes and lakes and metal flake pigments can also be used for the usual purposes and in the usual amounts.

The compositions of the invention are made by simply blending the ingredients together. Pigments are ordinarily added as mill bases, made by techniques well known to any paint formulator.

The compositions can be applied by brushing, spraying, dipping, rolling, or the like, and require no unusual equipment or techniques for drying.

EXAMPLES

The following examples illustrate the invention. All parts are by weight.

*Example 1*

|  | Parts by weight |
|---|---|
| Bis[(2-vinyl-1,3-dioxolan-4-yl)butyl]itaconate | 712 |
| (2-vinyl-1,3-dioxolan-4-yl-butyl)oleate | 612 |
| Tetrahydrofurfuryl methacrylate | 355 |
| 43% dehydrated castor oil modified glycerol phthalate alkyd resin solution, unreacted hydroxyl content equivalent to 5% glycerin, acid No. 7–13, 56% solids in xylene | 761 |
| Red lead | 2952 |
| Iron oxide | 4924 |
| Aluminum stearate | 44 |
| Cobalt butyl phthalate solution (4% cobalt) | 54.7 |
| Zirconium octoate, basic, 6% zirconium | 72 |
| 1,1,3,3-tetramethyl guanidine | 11 |

The composition is prepared by mixing the ingredients together. The pigments are first made into a base by milling the red lead and iron oxide with a portion of the cyclic acetal film former until a smooth dispersion is obtained.

The composition, when brushed on a sheet of raw steel, dries tack-free in about 3½ hours in air at 70° F. as compared with 7 hours for a sheet brushed with the same composition lacking the guanidine accelerator.

*Example 2*

A composition is prepared as in Example 1 except that 1,1,3,3-tetraoctylguanidine is used as the accelerator.

When applied in the same fashion, the composition dries in slightly less than 4 hours as compared with 7 hours for the same composition lacking the guanidine accelerator.

*Example 3*

A composition is prepared as in Example 1. To this composition are then added 25 parts of t-butyl hydroperoxide.

When applied as in Example 1, the composition dries tack-free in about 2 hours at 70° F.

*Example 4*

|  | Parts by weight |
|---|---|
| Bis[(2-vinyl-1,3-dioxolan-4-yl)butyl]itaconate | 313 |
| (2-vinyl-1,3-dioxolan-4-yl-butyl)pelargonate | 83 |
| Long oil linseed modified glycerol phthalate alkyl resin solution, unreacted hydroxyl content equivalent to 1.7% glycerin, acid No. 5–9, 63% solids in a hydrocarbon solvent having a boiling point of 175–233° C. and an aniline point of 4° C. | 83 |
| Brown iron oxide | 347 |
| Zinc chromate | 258 |
| Calcium carbonate | 75 |
| Talc | 38 |
| Cobalt naphthenate solution (6% cobalt) | 5 |
| 1,1-diallyl-3,3-dicyclohexylguanidine | 2 |

This composition is prepared as shown in Example 1. A primed steel panel dipped into this composition dries tack-free in 6 hours in air at 70° F., as compared with 11 hours for the same composition lacking the guanidine accelerator.

*Example 5*

|  | Parts by weight |
|---|---|
| Bis[(2-vinyl-1,3-dioxolan-4-yl)butyl]orthophthalate | 580 |
| Bis[(2-vinyl-1,3-dioxolan-4-yl)butyl]itaconate | 200 |
| Titanium dioxide | 100 |
| Ferrite yellow | 63 |
| Phthalo cyanine green | 50 |
| Cobalt octoate solution (8% cobalt) | 10 |
| 1-methyl-1-cyclodecyl-3,3-diisopropenyl guanidine | 2 |

This composition is prepared as shown in Example 1.

When sprayed to an aluminum substrate the composition dries tack-free in 3 hours at 70° F. The same composition, lacking the guanidine accelerator, dries tack-free in 7 hours at 70° F.

*Example 6*

| | Parts by weight |
|---|---|
| [(2-vinyl-1,3-dioxolan-4-yl)butyl]maleate | 100 |
| 37% coconut oil modified glycerol phthalate alkyd resin solution, unreacted hydroxyl content equivalent to 5.4% glycerin, 60% solids in xylol, acid No. 4–8 | 1000 |
| Butyl ether of urea-formaldehyde condensate, 50% solids in butanol | 600 |
| Carbon black | 50 |
| Cobalt octoate solution (6% cobalt) | 6.7 |
| 1,1,3,3-tetramethyl guanidine | 6.5 |

The composition is prepared as shown in Example 1.

When sprayed to a galvanized iron substrate and baked for 20 minutes at 325° C., it gives a tough, durable, black finish.

The claims are:
1. A liquid coating composition comprising
   (A) at least one compound containing a plurality of 1,3-cyclic acetal radicals which bear vinyl or substituted vinyl radicals in their 2-positions;
   (B) a metal drier;
   and
   (C) a compound represented by the formula

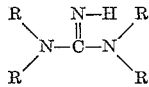

where R is
   an alkyl radical of 1 through 8 carbon atoms,
   an alkenyl radical of 3 through 10 carbon atoms, or
   a cycloalkyl radical of 6 through 10 carbon atoms.
2. A composition according to claim 1 wherein the compound in (C) is 1,1,3,3-tetramethyl guanidine.
3. A composition according to claim 1 wherein the compound in (A) is a polycarboxylic acid ester having a plurality of 2-vinyl-1,3-dioxonyl radicals.
4. A composition according to claim 1 wherein the compound in (A) is a dicarboxylic acid diester having two 2-vinyl-1,3-dioxonyl radicals.
5. A composition according to claim 1 wherein the compound in (A) is bis[(2-vinyl-1,3-dioxolan-4-yl)butyl] orthophthalate.
6. A composition according to claim 1 wherein the compound in (A) is bis[(2-vinyl-1,3-dioxolan-4-yl)butyl] itaconate.
7. A composition according to claim 1 wherein the compound in (B) is a cobalt compound.
8. A composition according to claim 1 additionally containing a t-alkyl hydroperoxide whose alkyl group contains 4 through 8 carbon atoms, a dialkyl phenylmethyl hydroperoxide whose alkyl groups contain 1 through 3 carbon atoms, or an alkyl aldehyde peroxide whose alkyl group contains 6 through 12 carbon atoms.
9. A method for shortening the air-drying time of a liquid coating composition, which composition comprises
   (A) at least one compound containing a plurality of 1,3-cyclic acetal radicals which bear vinyl or substituted vinyl radicals in their 2-positions, and
   (B) a siccative metal drier,
said process comprising incorporating into said composition, before it is air-dried, a compound represented by the formula

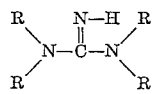

where R is
   an alkyl radical of 1 through 8 carbon atoms,
   an alkenyl radical of 3 through 10 carbon atoms, or
   a cycloalkyl radical of 6 through 10 carbon atoms.
10. An article bearing a dried film of the composition of claim 1.

References Cited by the Examiner

UNITED STATES PATENTS

| 2,159,055 | 5/1939 | Sloan et al. | 134—39 |
| 3,010,923 | 11/1961 | Ikeda | 260—22 |
| 3,018,266 | 1/1962 | Lundberg | 260—564 |
| 3,053,792 | 9/1962 | Ikeda | 260—17 |
| 3,190,878 | 6/1965 | Ikeda | 260—23.5 |

FOREIGN PATENTS

| 626,643 | 8/1961 | Canada. |

LEON J. BERCOVITZ, *Primary Examiner.*

R. W. GRIFFIN, *Assistant Examiner.*